(12) United States Patent
Biris et al.

(10) Patent No.: US 10,704,534 B2
(45) Date of Patent: Jul. 7, 2020

(54) FAULT RIDE THROUGH METHOD FOR LOAD IMPACT MINIMIZATION

(71) Applicant: VESTAS WIND SYSTEMS A/S, Aarhus N (DK)

(72) Inventors: Ciprian Biris, Hinnerup (DK); Uffe C. Merrild, Bryrup (DK); Leif Svinth Christensen, Thorsø (DK); Martin Ansbjerg Kjær, Harlev J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/143,818

(22) Filed: Sep. 27, 2018

(65) Prior Publication Data

US 2019/0093634 A1 Mar. 28, 2019

(30) Foreign Application Priority Data

Sep. 28, 2017 (DK) .............................. PA201770736

(51) Int. Cl.
*F03D 9/25* (2016.01)
*H02J 3/38* (2006.01)
(Continued)

(52) U.S. Cl.
CPC ........... *F03D 9/255* (2017.02); *F03D 7/0284* (2013.01); *H02J 3/1885* (2013.01); *H02J 3/386* (2013.01)

(58) Field of Classification Search
USPC .................................. 290/44, 55; 363/34, 35
See application file for complete search history.

(56) References Cited

U.S. PATENT DOCUMENTS 6,400,585 B2 * 6/2002 Jiang-Hafner ............ H02J 3/36
363/35
7,804,184 B2 * 9/2010 Yuan ....................... H02J 3/386
290/44
(Continued)

FOREIGN PATENT DOCUMENTS

EP 2017936 A1 1/2009
EP 2696070 A1 2/2014
(Continued)

OTHER PUBLICATIONS

Extended European Search Report for Application No. 18196816.5-1202 dated Jun. 11, 2018.
(Continued)

*Primary Examiner* — Pedro J Cuevas
(74) *Attorney, Agent, or Firm* — Patterson + Sheridan, LLP (57) ABSTRACT

Controlling a wind turbine during a grid fault where the grid voltage drops below a nominal grid voltage. After detection of a grid fault, the total current limit for the power converter output is increased to a total maximum overload current limit. Depending on whether active or reactive current generation is prioritized, an active or reactive current reference is determined. The active current reference is determined in a way so that a reduction in active power production due to the grid voltage drop is minimized and based on the condition that the vector-sum of the active output current and the reactive output current is limited according to the total maximum overload current limit, and a maximum period of time is determined in which the power converter can be controlled based on the active/reactive current references. Afterwards the power converter is controlled based on the active and reactive current references.

13 Claims, 4 Drawing Sheets

(51) Int. Cl.
*H02J 3/18* (2006.01)
*F03D 7/02* (2006.01)

(56) References Cited

U.S. PATENT DOCUMENTS

| | | | | |
|---|---|---|---|---|
| 8,379,416 B1* | 2/2013 | Datta | ................ | H02M 5/4505 |
| | | | | 363/34 |
| 9,184,685 B2* | 11/2015 | Gupta | ................ | H02H 7/065 |
| 9,379,546 B2* | 6/2016 | Li | ................ | H02J 3/00 |
| 2002/0008982 A1* | 1/2002 | Jiang-Hafner | ............ | H02J 3/36 |
| | | | | 363/148 |
| 2008/0252076 A1 | 10/2008 | Fortmann et al. | | |
| 2009/0206606 A1 | 8/2009 | Jorgensen et al. | | |
| 2010/0142237 A1* | 6/2010 | Yuan | ................ | H02J 3/386 |
| | | | | 363/97 |
| 2013/0051091 A1* | 2/2013 | Datta | ................ | H02M 5/4505 |
| | | | | 363/35 |
| 2013/0313826 A1* | 11/2013 | Gupta | ................ | H02H 7/065 |
| | | | | 290/44 |
| 2014/0362617 A1* | 12/2014 | Li | ................ | H02J 3/00 |
| | | | | 363/34 |
| 2015/0137520 A1 | 5/2015 | Garcia | | |

FOREIGN PATENT DOCUMENTS

| | | |
|---|---|---|
| EP | 3012938 A1 | 4/2016 |
| WO | 2007140466 A2 | 12/2007 |
| WO | 2011120523 A2 | 10/2011 |
| WO | 2012062323 A2 | 5/2012 |

OTHER PUBLICATIONS

Danish Search Report for Application No. PA 2017 70736, dated Mar. 23, 2018.

\* cited by examiner

FAULT RIDE THROUGH METHOD FOR LOAD IMPACT MINIMIZATION

FIELD OF THE INVENTION

The present invention relates to method for controlling power generation of a wind turbine, particularly for controlling a wind turbine during a grid fault.

BACKGROUND OF THE INVENTION

During a grid fault the grid voltage may decrease. The decreased grid voltage leads to a decrease of the active power generation and consequently to an increase load of the drive train between the rotor and the generator.

In some situations, the wind turbine is required to support the grid by generation and injection of reactive current. The requirement to generate reactive current may contribute with an additional decrease of the active power generation.

Accordingly, it is problem that the wind turbine, particularly the drive train, is exposed to an increased load during fault ride through situations.

WO2015/086022A1 discloses a method for controlling reactive current injection in a wind power plant during a grid fault. The method includes measuring an amount of reactive current to be provided by the wind power plant to the grid during the grid fault. The method further includes determining a difference between a given required reactive current contribution from the wind power plant and the amount of reactive current to be provided by the wind power plant to the grid during the grid fault. The method includes controlling a plurality of wind turbine generators in the wind power plant to generate additional reactive current according to a reactive current reference generated based on the difference.

WO2015/086022A1 does not address load problems during grid faults. Accordingly, there is a need for a technical solution which solves the above mentioned problem.

SUMMARY OF THE INVENTION

Aspects of the invention may improve wind turbines, particularly to improve wind turbines with respect to reducing structural loads of the drive train and other components during fault ride through situations.

In a first aspect of the invention there is provided method for controlling a wind turbine during a grid fault where the grid voltage drops below a nominal grid voltage, the wind turbine comprises a doubly fed induction generator connected to a grid, a power converter connected between the grid and rotor windings of the doubly fed induction generator, where the power converter comprises a rotor inverter and a grid inverter, where the rotor invertor is controllable to control production of active and reactive output currents based on respective active and reactive current references, where the active and reactive output currents are based on current delivered by the doubly fed induction generator and current delivered or consumed by the grid inverter, and where the vector-sum of active output current and reactive output current is limited according to a total current limit, the method comprises determining a presence of the grid fault,
setting the total current limit to a total maximum overload current limit,
determining the active and reactive current references based on a control function which determines the active current reference so that a reduction in active power production due to the grid voltage drop is minimized, where the active and reactive current references are determined subject to the condition that the vector-sum of the active output current and the active current reference is based on the active power production before the grid fault and an obtained grid voltage corresponding to the grid voltage drop, and the reactive output current is limited according to the total maximum overload current limit,
determining a maximum period of time in which the power converter can be controlled based on the active and reactive current references, and
controlling the power converter based on the active and reactive current references.

Advantageously, by setting the total current limit to a total maximum overload current limit which may be larger than the total current limit used before the grid faults, the active current reference may be increased so that a larger active current can be produced during the grid fault as compared to active current before the grid fault. The total current limit may be set to the maximum current, at least for a given period of time, to enable an increase of the active current production. The increased active current compensates the voltage drop so that the reduction in active power is reduced or eliminated. Accordingly, loads of the drive train is correspondingly reduced. It is understood that the so desired minimization of the drop of the active power is a minimization subject the constraint of the total maximum overload current limit and possible constraints on a minimum reactive current reference, e.g. due to grid support requirements. It is also understood that the limitation of the vector-sum of the active output current and the reactive output current to the total maximum overload current limit may be achieved by limiting the vector-sum of the active and reactive current references to the total maximum overload current limit. Further advantage of the first aspect, the control function determines the active current reference based on the active power production before the grid fault and an obtained grid voltage corresponding to the grid voltage drop. For example, the active current reference may be determined as the active power production before the grid fault divided by the grid voltage present at the grid fault. The grid voltage may vary during the grid fault and, therefore, the active current reference may be adjusted during the grid fault dependent on variations of the grid voltage. The grid voltage may be obtained as an average of voltage levels over a suitable period of time to ensure sufficiently smooth variations of the active current reference.

According to an embodiment, the total maximum overload current limit is larger than a total current limit used at the time when the grid fault is detected. Advantageously, this provides the possibility to increase the active current during the fault ride through beyond the active current produced before the grid fault and thereby to increase production of active power. When production of active current is prioritized or the required production of reactive current is at a low level, the active current can be increased subject to the constraint of the total maximum overload current limit. The total maximum overload current limit is larger than a total current limit used at the time when the grid fault is detected at least for rotation speeds of the generator at or above synchronous speed. I.e. this embodiment is valid for rotation speeds at or above synchronous speed, and/or for sub-synchronous speeds where the rotation speed is below synchronous speed.

According to an embodiment, controlling the power converter based on the active and reactive current references, comprises increasing the active output current from an active output current level present before the grid fault to the active current reference the reduction in the active power production due to the grid voltage drop is minimized. The control of increasing the active current may be performed by use of a suitable feedback controller.

According to an embodiment, the control function is configured in an initial first step to determine the active current reference or the reactive current reference and in a subsequent second step to determine the active current reference or the reactive current reference which was not determined in the first step. Accordingly, the current references may be determined according to a prioritization of the active and reactive current production.

According to an embodiment, if the active current reference is determined in the initial first step, the reactive current reference is determined subject to the condition that the vector-sum of the determined active current reference current and the reactive current reference is limited according to the total maximum overload current limit. Accordingly, if not all current capacity is used for the production of active current, the remaining capacity can be used for production of reactive current, e.g. for supporting the grid.

According to an embodiment, if the reactive current reference is determined in a first step, the active current reference is determined subject to the condition that the vector-sum of the determined reactive current reference and the active current reference is limited according to the total maximum overload current limit. Accordingly, if not all current capacity is used for the production of reactive current, which would normally be the case, the remaining capacity can be used for production of active current for the purpose of reducing a drop in active power production. The reactive current reference may be determined according to a predetermined function, e.g. a function giving the reactive current reference as a function of the voltage drop.

According to an embodiment the method is initiated based on comparing the grid voltage with a grid voltage drop threshold. Thus, if it is detected that the grid voltage has decreased below a given threshold, this indicates a grid fault, so that the fault ride through procedure can be initiated.

According to an embodiment, the method comprises determining a maximum period of time in which the power converter can be controlled based on the active and reactive current references. The time where the power converter can be operated in the fault ride through mode can be determined as a function of the voltage drop where the function describes a decreasing times for increasing voltage drops.

According to an embodiment, the method comprises, after detecting a recovery from the grid fault, adjusting the active current reference so that the produced active power approaches a power reference for the active power production. If the active power production at the end of the grid fault is lower than the desired active power production after recovery, e.g. an active power production defined by an external power reference from a grid operator, the plant controller or other source, the active power production may be ramped up so that large loads on the drive train are avoided.

A second aspect of the invention relates to a control system for controlling a wind turbine during a grid fault where the grid voltage drops below a nominal grid voltage, the wind turbine comprises a doubly fed induction generator connected to a grid, a power converter connected between the grid and rotor windings of the doubly fed induction generator, where the power converter comprises a rotor inverter and a grid inverter, where the rotor invertor is controllable to control production of active and reactive output currents based on respective active and reactive current references, where the active and reactive output currents are based on current delivered by the doubly fed induction generator and current delivered or consumed by the grid inverter, and where the vector-sum of active output current and reactive output current is limited according to a total current limit, where the control system is arranged to perform the method according to the first aspect.

The control system may be configured as digital data processor or other computing unit arranged to perform the method, e.g. by execution of software code being adapted to perform the method of the first aspect.

A third aspect of the invention relates to a computer program product comprising software code adapted to control a wind turbine when executed on a data processing system, the computer program product being adapted to perform the method of the first aspect.

A fourth aspect of the invention relates to a wind turbine comprising a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1A:
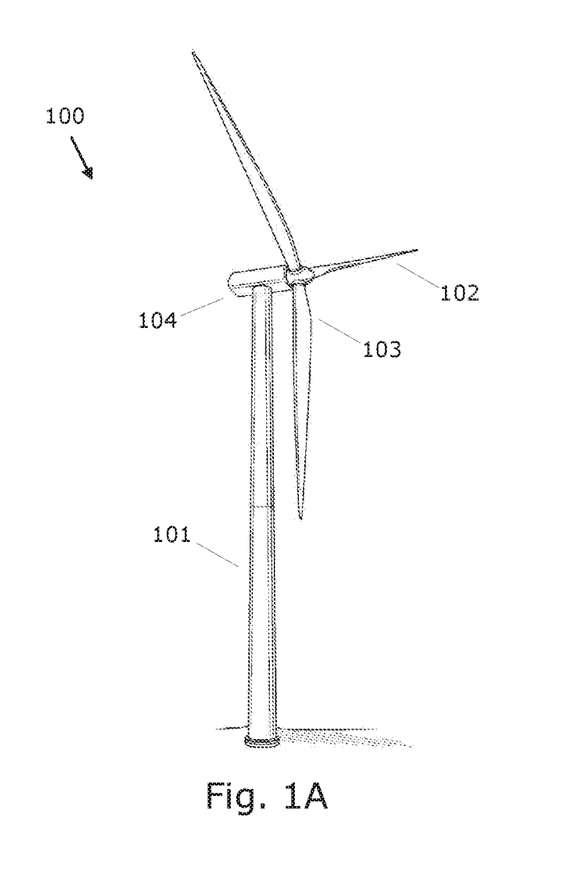
FIG. 1A shows a wind turbine.

FIG. 1A shows a wind turbine 100 (WTG) comprising a tower 101 and a rotor 102 with one or more rotator blades 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the one or more rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a converter and a grid inverter. The converter converts the generator AC power into DC power and the grid inverter converts the DC power into an AC power for injection into the utility grid via an output power terminal of the wind turbine 100.

The generator and the power converter are controllable to produce power according to a reference signal. For example, the generator and the power converter may be controllable to produce a desired active output current Iq and a desired reactive output current Id.

Figure 1B:
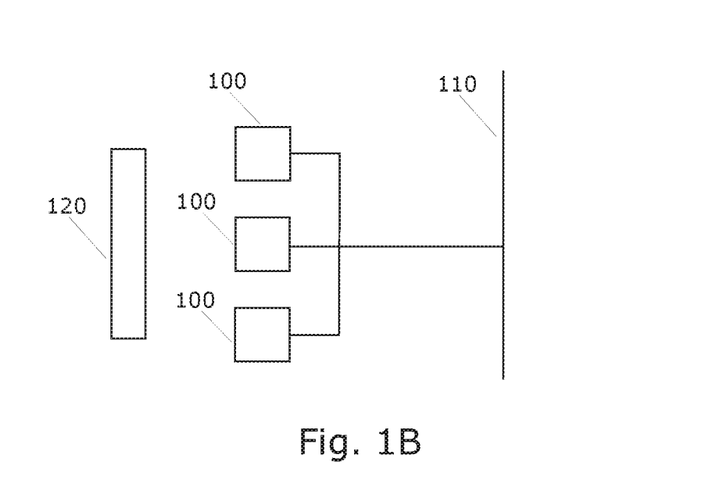
FIG. 1B shows a plurality of wind turbines arranged in a wind park.

FIG. 1B shows a plurality of wind turbines 100 arranged in a wind park and connected to a grid 110. The plurality of wind turbines 100 may be controlled by a park controller 120.

In case of a grid fault such as a low voltage grid fault, the voltage of the grid 110 and therefore the voltage at the output power terminal the wind turbine 100 may suddenly decrease. Due to the sudden decrease of the grid voltage, the wind turbine will decrease production of active power. For example, assume that the wind turbine generator's active power production before the fault is 1 PU and the grid voltage is 1 PU. Due to a grid fault, the grid voltage reduces to e.g. 0.85 PU. This may lead to a reduction in active power production to 0.85 PU or less depending on power control strategies. The reduction in active power production generates a counter torque in the drive train of the wind turbine. Therefore, due to the grid fault, the generated load of the drive train may lead to increased wear of the wind turbine.

Figure 2A:
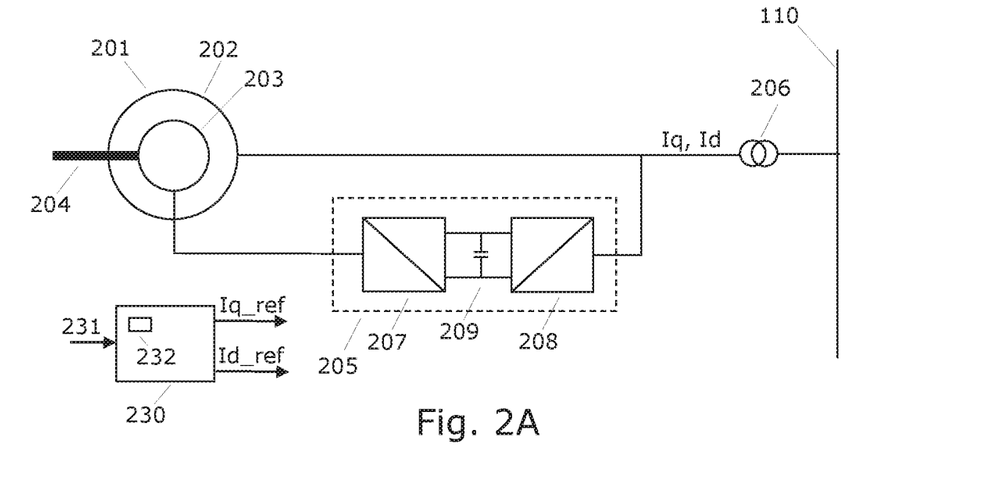
FIG. 2A shows an example of generator and power converter of a wind turbine.

FIG. 2A shows an example of the generator 201 and power converter 205. According to various embodiments, the generator 201 is a doubly fed induction generator (DFIG). The generator 201 comprises a stator 202 with stator windings and a rotor 203 with rotor windings. The rotor is driven by the drive train 204 which may also include a gear box (not illustrated).

The doubly fed induction generator is connected with the grid 110 via a transformer 206. A power converter 205 is connected between the grid 110 and rotor windings of the rotor 203 of the generator 201. The power converter 205 and the generator 201 are controllable to produce active and reactive output currents Iq, Id based on respective active and reactive current references Iq_ref, Id_ref.

Specifically, the power converter 205 comprises a rotor inverter 207, a grid inverter 208 and DC link 209. The rotor inverter 207 comprises control input (not shown) for controlling the production of active and reactive output currents Iq, Id based on the active and reactive current references Iq_ref, Id_ref or other reference signals derived from the current references.

As shown in FIG. 2A, the active and reactive output currents Iq, Id injected to the grid are determined by current Iq1, Id1 delivered by the generator 201 (e.g., the DFIG) and current Iq2, Id2 at the output of the grid inverter 208.

It is noted that the current at the output of the grid inverter 208 may consist only of active power Iq2, i.e. so that no reactive power Id2 is produced or consumed by the grid inverter 208. However, in general the current at the output of the grid inverter 208 may comprise both an active component Iq2 and a reactive component Id2. The current delivered by the generator 201 comprises, in general, an active component Iq1 and a reactive component Id1.

In general, for rotation speeds of the generator above synchronous speed, the grid inverter 208 supplies power to the grid so that the current Iq2, Id2 add to the current Iq1, Id1 from the generator, whereas for rotation speeds below synchronous speed, the grid inverter 208 consumes power so that the current Iq2, Id2 flows towards the grid inverter 208.

It is noted that the current at the output of the grid inverter 208 may consist only of active power, i.e. so that no reactive power is produced or consumed.

The configuration in FIG. 2A uses a 2-widings transformer which means that grid inverter voltage and the stator voltage of the generator 201 are the same. Other configurations may use a 3-winding transformer (illustrated with dashed connection lines to the transformer). In this case, the grid inverter connects to 3rd winding of the transformer, the stator 202 connects to the 2nd winding and high-voltage grid to 1st winding. Embodiments of the invention can be based on different configurations of the generator 201 and power converter 205.

A control system 230 is arranged for determining the active and reactive current references Iq_ref, Id_ref based on input 231.

Figure 2B:
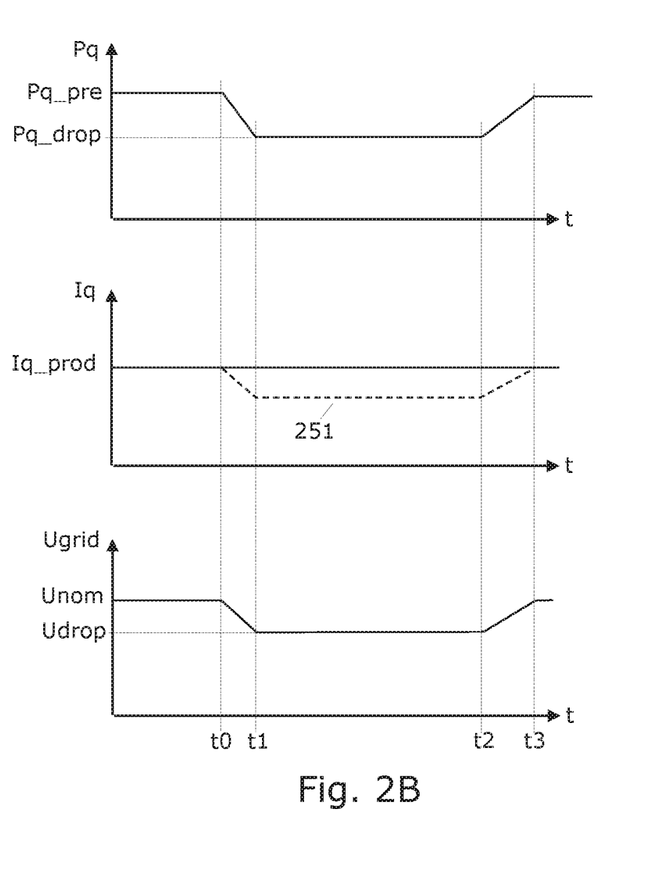
FIG. 2B illustrates a situation where the grid voltage drops from the nominal grid voltage to an under-nominal grid voltage.

FIG. 2B illustrates a situation where the grid voltage Ugrid drops from the nominal grid voltage Unom to a lower voltage Udrop. The grid fault and voltage drop starts at t0 and ends at t3. Assuming that the wind turbine produces a constant amount of active current Iq_prod both prior to the grid fault and during the grid fault, the active power production drops from Pq_pre prior to the grid fault to Pq_drop due to the reduced grid voltage. The reduced power Pq_drop is substantially equal to Iq_prod*Udrop. In other situations the active current production Iq is reduced as illustrated by current drop 251 during the grid fault, e.g. in order to enable injection of an increased reactive current Id during the grid fault in order to support the grid, i.e. for supporting an increase of the grid voltage Ugrid. I such situations where the active current Iq is also reduced, the reduction in active power production Pq and, therefore, the load of the drive train 204 becomes even larger.

Figure 3:
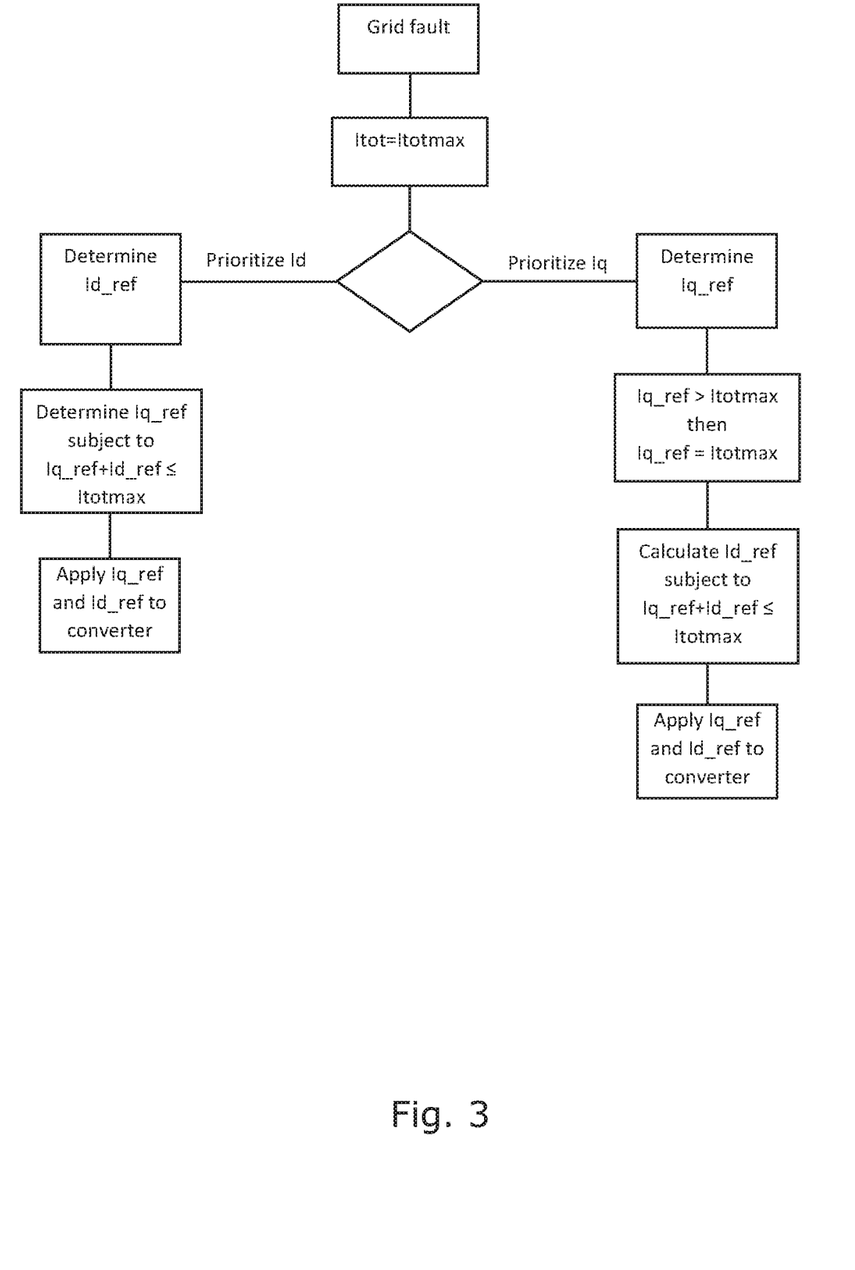
FIG. 3 illustrates a method for controlling a wind turbine in a fault ride through mode.

FIG. 3 illustrates a method for controlling a wind turbine 100, particularly the power converter 205 and generator 201, during a grid fault where the grid voltage Ugrid drops below the nominal grid voltage Unom for a period of time. Methods for controlling the wind turbine 100 during grid faults are also referred to as fault ride through methods. As described above, the power converter 205 and the generator 201 are controllable to produce active and reactive output currents Iq and Id based on respective active and reactive current references Iq_ref and Id_ref.

The vector-sum of active output current Iq and reactive output current Id and, therefore, the corresponding references Iq_ref and Id_ref, is limited according to a total current limit Itot. The output currents Iq and Id are the magnitudes of corresponding vector or phasor representations of the currents. Accordingly, the vector-sum can be determined as the square root of the sum of the squares of Iq and Id.

Initially, the presence of the grid fault is determined. The grid fault may be determined by the control system 230 based on a measured grid voltage, e.g. measured at a point between the transformer 206 and the grid 110. For example, a fault ride through state, i.e. a method according to an embodiment, may be invoked if the grid voltage Ugrid decreases below a grid voltage threshold which is lower than the nominal grid voltage Ugrid. The presence of the grid fault could also be determined, i.e. merely informed, via a control signal to the control system 230 which indicates presence of the grid fault, or in other ways. The grid voltage or control signal may be provided via input 231.

Thus, the activation of the fault ride through state may be triggered dependent on a measured grid voltage Ugrid or dependent on other signals such a grid fault signals. According to an embodiment, the method comprises comparing the grid voltage Ugrid with a grid voltage drop threshold UT in order to determine if the grid voltage Ugrid is below the threshold, e.g. a threshold of 0.9 PU, 0.8 PU, 0.7 PU or other suitable threshold. If the grid voltage is below the threshold, the fault ride through method is activated.

After entering the fault ride through state, the total current limit Itot is set to a total maximum overload current limit Itotmax.

The value of the total maximum overload current limit Itotmax depends on operational conditions of the generator 201. Under conditions where the generator 201 operates with a rotor speed at or above synchronous speed, the total maximum overload current limit Itotmax can be set to a maximum current which can be produced by the generator 201, i.e. the maximum current according to specifications of the generator 201.

The maximum current which can be produced by the generator may be given by a factor Foverload multiplied with the total nominal current limit of the generator Itotnom: Itotmax=Foverload*Itotnom. Foverload is greater than one, e.g. equal to 1.2 or 1.3.

The total nominal current limit Itotnom may depend on configurations of the generator, e.g. dependent on whether the generator is operated in a star or delta mode connection.

For rotor speeds below synchronous speed, the total maximum overload current limit Itotmax may be set to a limit which is lower than the total nominal current limit Itotnom since in such situations the power converter 205 needs to supply power to the rotor 203.

In general, the total maximum overload current limit Itotmax is larger than the total current limit Itot used at the time when the grid fault is detected. For example, at least for rotation speeds of the generator above synchronous speed, the total maximum overload current limit Itotmax is larger than the total nominal current limit Itotnom used during nominal operation of the generator 201. Similarly, for rotation speeds below synchronous speed, the total maximum overload current limit Itotmax may be set to a value which is larger than Itot used at the time when the grid fault started. This value can be determined in different ways and dependent on the configuration of the power converter 205.

In a next step it is determined if production of active or reactive current is prioritized. For example, in some situations production of reactive current is prioritized for the purpose of supporting the grid by assisting in increasing the grid voltage Ugrid. In other situations, grid support is not required and, therefore, production of active current can be prioritized.

In general, whether active or reactive current is prioritized, the method for controlling the wind turbine 100 includes determining the active and reactive current references Iq_ref, Id_ref. The active current reference Iq_ref is determined, by use of a control function 232 or algorithm comprised by the control system 230, so that a reduction in active power production Pq due to the grid voltage drop is minimized. The active and reactive current references Iq_ref, Id_ref are determined subject to the condition that the vector-sum of the active output current Iq and the reactive output current Id is limited according to the total maximum overload current limit Itotmax. The active current reference Iq_ref can be determined in different ways as explained by examples below in order to minimize the reduction of the active power production Pq.

At least when production of active current is prioritized or when an increase of the production of active current Iq is allowed, the control of the power converter based on the active and reactive current references Iq_ref, Id_ref, implies that the produced active output current Iq is increased from an active output current level Iq_pre present before the grid fault to the active current reference Iq_ref so that the reduction in the active power production due to the grid voltage drop is minimized. The active output current level Iq_pre present before the grid fault may be determined according to a desired production of active current or power provided by the park controller 120 or other external reference.

The determined active and reactive current references Iq_ref, Id_ref are used for controlling the power converter 205, directly or based on one or more control references determined from Iq_ref and Id_ref.

According to an example, in the case where production of active current is prioritized the control function 232 determines the active current reference Iq_ref based on the active power production Pq_pre before the grid fault and an obtained grid voltage Ugrid corresponding to the grid voltage drop Udrop. For example, if the grid voltage has dropped to 0.85 PU and the active power production Pq_pre is 1 PU, the active current reference Iq_ref can be determined as Pq_pre/Udrop=1 PU/0.85 PU=1.18 PU. Accordingly, by increasing the active current Iq to 1.18 PU the active current production Pq is maintained at 1 PU.

When production of active current is prioritized, the active current reference Iq_ref is limited according to the total maximum overload current limit Itotmax. If the reactive current Id can reduced to zero, Iq_ref is limited to Itotmax. In general, the active current reference is limited according to the constraint that the vector-sum of the active current reference Iq_ref and a minimum reactive current reference should be less than or equal to Itotmax. The minimum reactive current reference may be a minimum reactive current production required also when active current is prioritized.

In case that the determined active current reference Iq_ref or the vector-sum of the active current reference Iq_ref and the minimum reactive current reference is less than the total maximum overload current limit Itotmax, the remaining current production capacity may be used for production of reactive current Id. In this case the reactive current reference Id_ref is determined subject to the constraint that the sum of the active current reference Iq_ref and the reactive current reference Id_ref is less than or equal to the total maximum overload current limit Itotmax.

In a situation where production of reactive current Id is prioritized, the reactive current reference Id_ref is determined, e.g. according to a predetermined function which may depend on the magnitude of the voltage drop Udrop. For example, the predetermined function may be in the form of a K-factor function. For certain ranges of the voltage drop Udrop, the determined reactive current reference Id_ref is increased as a function of increasing voltage drops Udrop. Accordingly, the predetermined function may be a function which depends on the voltage drop Udrop. Alternatively, the predetermined function may be independent from the voltage drop Udrop and provide the reactive current reference Id_ref, e.g. as constant reactive current reference.

Normally, the reactive current reference Id_ref is less than the total maximum overload current limit Itotmax, but would otherwise be limited according to Itotmax.

In a situation that the determined reactive current reference Id_ref is less than the total maximum overload current limit Itotmax, which would normally be the case, the remaining current production capacity is used for production of active current Iq. In this situation the active current reference Iq_ref is determined subject to the constraint that the vector-sum of the active current reference Iq_ref and the determined reactive current reference Id_ref is less than or equal to the total maximum overload current limit Itotmax.

Thus, in general the control function 232 is configured in an initial first step to determine the active current reference Iq_ref or the reactive current reference Id_ref and in a subsequent second step to determine the active current reference Iq_ref or the reactive current reference Id_ref which was not determined in the first step. If the active current reference Iq_ref was determined in the initial first step, the reactive current reference Id_ref is determined in the subsequent step subject to the condition that the vector-sum of the determined active current reference current Iq_ref and the reactive current reference Id_ref is limited according to the total maximum overload current limit Itotmax. Similarly, if the reactive current reference Id_ref was determined in the first step, the active current reference Iq_ref is determined in the sequent step subject to the condition that the vector-sum of the reactive current reference Id_ref and the active current reference Iq_ref is limited according to Itotmax.

Figure 4A:
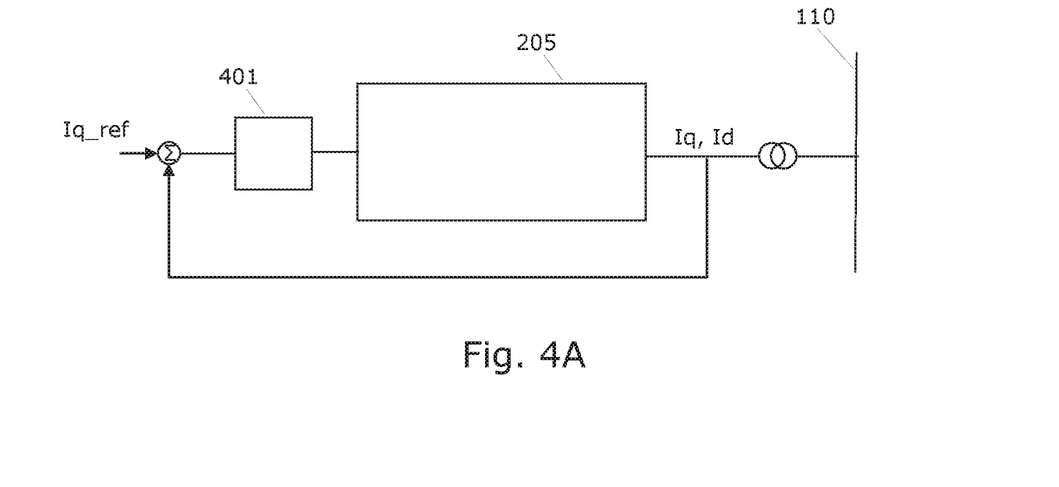
FIG. 4A shows a closed loop control system for controlling the power converter dependent on an active current reference.

FIG. 4A shows a closed loop control system for controlling the power converter 205 to provide production of active current Iq according to the determined active current reference Iq_ref. The control algorithm 401 implements a suitable controller such as a PI controller which determines a control input for the power converter 205 based on the determined difference between the current reference Iq_ref and the measured produced active current Iq. The reactive current Id may be controlled in a similar way based on the reactive current reference Id_ref. Embodiments of the invention are not necessarily limited to use of closed loop control systems controlling the current production, but other methods such as feed-forward may be used. The closed loop control system in FIG. 4A could be configured differently, e.g. with a 3-windings transformer as described in connection with FIG. 2A.

Figure 4B:
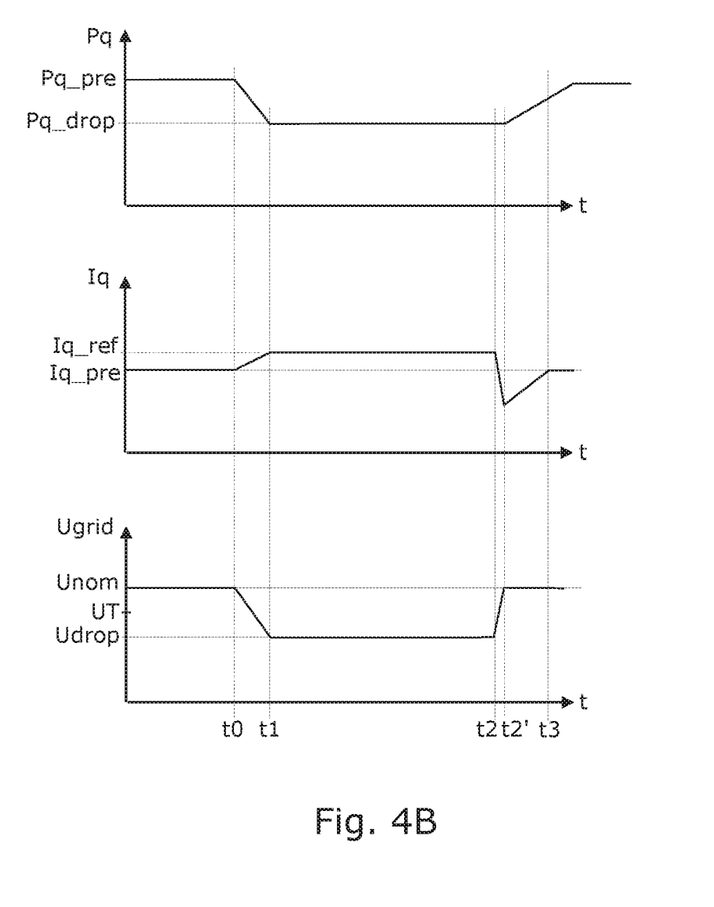
FIG. 4B illustrates the fault ride through mode according to an embodiment of the invention in a situation where the grid voltage drops to an under-nominal grid voltage.

FIG. 4B illustrates the effect of an embodiment of the invention in a situation where the grid voltage drops to Udrop. In response to the voltage drop, the active current is increased from the active current Iq_pre produced prior to the grid fault starting at t0 to Iq_ref. The new active current reference Iq_ref may have been determined in situations either where production of active or reactive current is prioritized. Due to the increased active current reference Iq_ref, the drop in active current production is reduced to Pq_drop or could have been eliminated or substantially eliminated (not illustrated).

The period of time where the power converter 205 can be operated according to various embodiments may be limited. For example, the period of time where the wind turbine 100 is operated in a fault ride through state may be determined based on a function with determines the maximum duration of the fault ride through state based on the magnitude of the voltage drop Udrop. Excess power which cannot be supplied to the grid (due to reduced capability of the grid inverter 208 resulting from the reduced grid voltage) may need to be burned off by a chopper. Therefore, the period of time may be determined dependent on the voltage the drop Udrop, e.g. so that period of time is decreased for increasing voltage drops Udrop. Additionally, the period of time may be determined based on the determined active current reference Iq_ref. Accordingly, the method for controlling the wind turbine may comprise a step of determining a maximum period of time where the power converter 205 can be controlled based on the determined active and reactive current references Iq_ref, Id_ref. Similarly, the method for controlling the wind turbine 100 may comprise monitoring the duration where the power converter is controlled based on the active and reactive current references Iq_ref, Id_ref in order to determine when the maximum period of time is reached. Before, the maximum period of time is reached, other active and reactive current references may be determined, e.g. an decreased active current reference which does not require use of the chopper for burning off excess power.

When the grid voltage returns to the nominal grid voltage Unom, the active power production may be ramped up from a reduced power level Pq_drop to a desired active power reference, e.g. an external power reference provided from the park controller 120 or other external power reference. The ramping is only required if the power production during the fault ride through mode is less than the power reference which is used after grid recovery. Thus, in some cases there will be no ramp because during the voltage drop the algorithm was able to supply the amount of active current necessary to produce the power required by the turbine controller. Accordingly, after detecting a recovery from the grid fault, the method for controlling the wind turbine 100 may comprise the step of adjusting the active current reference Iq_ref so that the produced active power Pq approaches a power reference such as an external power reference. The step of adjusting the produced active current reference Iq_ref may be performed by ramping the active current reference Iq_ref down until the power reference, e.g. the external power reference, is reached.

FIG. 4B shows a situation where the grid voltage increases to the nominal value Unom during the period t2-t2'. The grid voltage may spike up to the nominal voltage very rapidly at the end of the grid fault, as shown during the period t2-t2'. This voltage spike could generate a corresponding power spike. This power spike may be compensated at least partly by a rapid change of the active current reference so that the active power injection stays as close as possible to Pq_drop.

Thus, according to an embodiment, in order to maintain the output power Pq at the previous level, i.e. the power Pq_drop produced during the grid fault, during the period t2-t2' where the voltage increases rapidly, the active current reference is decreased to a suitable level which may be lower the reference Iq_ref used before the grid fault.

After the grid voltage has stabilized at t2', the active current reference Iq_ref is ramped until the power reference, e.g. the external power reference, is reached at t3.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine during a grid fault where a grid voltage drops below a nominal grid voltage, wherein the wind turbine comprises a doubly fed induction generator (DFIG) connected to a grid, a power converter connected between the grid and rotor windings of the DFIG, wherein the power converter comprises a rotor inverter and a grid inverter, wherein the rotor inverter is controllable to control production of active and reactive output currents based on respective active and reactive current references, wherein the active and reactive output currents are based on current delivered by the DFIG and current delivered or consumed by the grid inverter, and wherein a vector-sum of active output current and reactive output current is limited according to a total current limit, the method comprising:

determining a presence of the grid fault;

setting the total current limit to a total maximum overload current limit;

determining the active and reactive current references based on a control function which determines the active current reference so that a reduction in active power production due to the grid voltage drop is minimized, wherein the active and reactive current references are determined subject to a condition that the vector-sum of the active output current and the active current reference is based on the active power production before the grid fault and an obtained grid voltage corresponding to the grid voltage drop, and that the reactive output current is limited according to the total maximum overload current limit;

determining a maximum period of time in which the power converter can be controlled based on the active and reactive current references; and controlling the power converter based on the active and reactive current references.

2. The method according to claim 1, wherein the total maximum overload current limit is a maximum current which can be produced by the DFIG.

3. The method according to claim 1, wherein the total maximum overload current limit is larger than a total current limit used at the time when the presence grid fault is determined.

4. The method according to claim 1, wherein controlling the power converter based on the active and reactive current references, comprises:

increasing the active output current from an active output current level present before the grid fault to the active current reference so that so that the reduction in the active power production due to the grid voltage drop is minimized.

5. The method according to claim 1, further comprising:

adjusting, after detecting a recovery from the grid fault, the active current reference so that the produced active power approaches a power reference for the active power production after the recovery from the grid fault.

6. The method according to claim 1, where the control function is configured in an initial first step to determine one of the active current reference and the reactive current reference, and in a subsequent second step to determine the other of the active current reference and the reactive current reference.

7. The method according to claim 6, wherein the active current reference is determined in the initial first step, and wherein the reactive current reference is determined subject to a condition that the vector-sum of the determined active current reference current and the reactive current reference is limited according to the total maximum overload current limit.

8. The method according to claim 6, wherein the active current reference is determined subject to a condition that the vector-sum of the determined reactive current reference and the active current reference is limited according to the total maximum overload current limit.

9. The method according to claim 8, where the reactive current reference is determined according to a predetermined function.

10. The method according to claim 1, wherein determining the presence of the grid fault comprises:

comparing the grid voltage with a grid voltage drop threshold.

11. A control system for controlling a wind turbine during a grid fault where the grid voltage drops below a nominal grid voltage, wherein the wind turbine comprises a doubly fed induction generator (DFIG) connected to a grid, a power converter connected between the grid and rotor windings of the DFIG, wherein the power converter comprises a rotor inverter and a grid inverter, wherein the rotor inverter is controllable to control production of active and reactive output currents based on respective active and reactive current references, wherein the active and reactive output currents are based on current delivered by the DFIG and current delivered or consumed by the grid inverter, wherein a vector-sum of active output current and reactive output current is limited according to a total current limit, and wherein the control system is arranged to perform an operation comprising:

determining a presence of the grid fault;

setting the total current limit to a total maximum overload current limit;

determining the active and reactive current references based on a control function which determines the active current reference so that a reduction in active power production due to the grid voltage drop is minimized, wherein the active and reactive current references are determined subject to a condition that the vector-sum of the active output current and the active current reference is based on the active power production before the grid fault and an obtained grid voltage corresponding to the grid voltage drop, and that the reactive output current is limited according to the total maximum overload current limit;

determining a maximum period of time in which the power converter can be controlled based on the active and reactive current references; and controlling the power converter based on the active and reactive current references.

12. A computer program product comprising software code adapted to control a wind turbine when executed on a data processing system, the computer program product being adapted to perform an operation for controlling a wind turbine during a grid fault where the grid voltage drops below a nominal grid voltage, wherein the wind turbine comprises a doubly fed induction generator (DFIG) connected to a grid, a power converter connected between the grid and rotor windings of the DFIG, wherein the power converter comprises a rotor inverter and a grid inverter, wherein the rotor inverter is controllable to control production of active and reactive output currents based on respective active and reactive current references, where the active and reactive output currents are based on current delivered by the DFIG and current delivered or consumed by the grid inverter, and wherein a vector-sum of active output current and reactive output current is limited according to a total current limit, the operation comprising:

determining a presence of the grid fault;

setting the total current limit to a total maximum overload current limit;

determining the active and reactive current references based on a control function which determines the active current reference so that a reduction in active power production due to the grid voltage drop is minimized, wherein the active and reactive current references are determined subject to a condition that the vector-sum of the active output current and the active current reference is based on the active power production before the grid fault and an obtained grid voltage corresponding to the grid voltage drop, and the reactive output current is limited according to the total maximum overload current limit;

determining a maximum period of time in which the power converter can be controlled based on the active and reactive current references; and controlling the power converter based on the active and reactive current references.

13. A wind turbine, comprising:

a tower;

a nacelle disposed on the tower;

a doubly fed induction generator (DFIG) disposed in the nacelle and connected to a grid;

a power converter connected between the grid and rotor windings of the DFIG, where the power converter comprises a rotor inverter and a grid inverter, wherein the rotor inverter is controllable to control production of active and reactive output currents based on respective active and reactive current references, wherein the active and reactive output currents are based on current delivered by the DFIG and current delivered or consumed by the grid inverter, wherein a vector-sum of active output current and reactive output current is limited according to a total current limit; and a control system configured to perform an operation, comprising:

determining a presence of a grid fault;

setting the total current limit to a total maximum overload current limit;

determining the active and reactive current references based on a control function which determines the active current reference so that a reduction in active power production due to the grid voltage drop is minimized, wherein the active and reactive current references are determined subject to the condition that the vector-sum of the active output current and the active current reference is based on the active power production before the grid fault and an obtained grid voltage corresponding to the grid voltage drop, and the reactive output current is limited according to the total maximum overload current limit;

determining a maximum period of time in which the power converter can be controlled based on the active and reactive current references; and controlling the power converter based on the active and reactive current references.

* * * * *

UNITED STATES PATENT AND TRADEMARK OFFICE
CERTIFICATE OF CORRECTION

PATENT NO. : 10,704,534 B2
APPLICATION NO. : 16/143818
DATED : July 7, 2020
INVENTOR(S) : Ciprian Biris et al.

It is certified that error appears in the above-identified patent and that said Letters Patent is hereby corrected as shown below:

On the Title Page

Under abstract "13 Claims, 4 Drawing Sheets" should read --20 Claims, 4 Drawing Sheets--

In the Claims

Column 10, Line 60-Column 14, Line 27, (approx.) should read:
--1. A method for controlling a wind turbine during a grid fault, wherein the wind turbine comprises a doubly fed induction generator (DFIG) connected to a grid, and a power converter comprising a rotor inverter and a grid inverter that are arranged between the grid and rotor windings of the DFIG, wherein the rotor inverter is controllable to control production of active output current and reactive output current based on an active current reference and a reactive current reference respectively, wherein the active output current and the reactive output current are based on current delivered by the DFIG and current delivered or consumed by the grid inverter, the method comprising:
    detecting a grid fault in which a grid voltage drops below a nominal grid voltage;
    setting a total current limit to a total maximum overload current limit;
    determining the active current reference and the reactive current reference according to a control function, wherein the active current reference is determined to minimize a reduction in active power production due to the grid voltage drop, wherein the active current reference and the reactive current reference are determined subject to a condition that a vector-sum of the active output current and the reactive output current is limited according to the total current limit; and
    controlling the power converter according to the active current reference and the reactive current reference.

2. The method according to claim 1, wherein the total maximum overload current limit is a maximum current which can be produced by the DFIG.

3. The method according to claim 1, wherein the total maximum overload current limit is larger than a total current limit used when the grid fault is detected.

Signed and Sealed this
Second Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,704,534 B2

4. The method according to claim 1, wherein controlling the power converter according to the active current reference and the reactive current reference comprises:
increasing the active output current from an active output current level present before detecting the grid fault to the active current reference, wherein the reduction in the active power production due to the grid voltage drop is minimized.

5. The method according to claim 1, further comprising:
adjusting, after detecting a recovery from the grid fault, the active current reference so that the produced active power approaches a power reference for the active power production after the recovery from the grid fault.

6. The method according to claim 1, wherein the control function is configured to:
in an initial first step, determine one of the active current reference and the reactive current reference; and
in a subsequent second step, determine the other of the active current reference and the reactive current reference.

7. The method according to claim 6,
wherein the active current reference is determined in the initial first step, and
wherein the reactive current reference is determined subject to a condition that a vector-sum of the active current reference current and the reactive current reference is limited according to the total maximum overload current limit.

8. The method according to claim 6, wherein the active current reference is determined subject to the condition that the vector-sum of the active current reference and the reactive current reference is limited according to the total maximum overload current limit.

9. The method according to claim 8, wherein the reactive current reference is determined according to a predetermined function.

10. The method according to claim 1, wherein detecting the grid fault comprises:
comparing the grid voltage with a grid voltage drop threshold.

11. A control system for controlling a wind turbine during a grid fault, wherein the wind turbine comprises a doubly fed induction generator (DFIG) connected to a grid, and a power converter comprising a rotor inverter and a grid inverter that are arranged between the grid and rotor windings of the DFIG, wherein the rotor inverter is controllable to control production of active output current and reactive output current based on an active current reference and a reactive current reference respectively, wherein the active output current and the reactive output current are based on current delivered by the DFIG and current delivered or consumed by the grid inverter, and wherein the control system is arranged to perform an operation comprising:
detecting a grid fault in which a grid voltage drops below a nominal grid voltage;
setting a total current limit to a total maximum overload current limit;
determining the active current reference and the reactive current reference according to a control function, wherein the active current reference is determined to minimize a reduction in active power production due to the grid voltage drop, wherein the active current reference and the reactive current reference are determined subject to a condition that a vector-sum of the active output current and the reactive output current is limited according to the total current limit; and controlling the power converter according to the active current reference and the reactive current reference.

12. A computer program product comprising software code adapted to control a wind turbine when executed on a data processing system, the computer program product being adapted to perform an operation for controlling a wind turbine during a grid fault, wherein the wind turbine comprises a doubly fed induction generator (DFIG) connected to a grid, and a power converter comprising a rotor inverter and a grid inverter that are arranged between the grid and rotor windings of the DFIG, wherein the rotor inverter is controllable to control production of active output current and reactive output current based on an active current reference and a reactive current reference respectively, and wherein the active output current and the reactive output current are based on current delivered by the DFIG and current delivered or consumed by the grid inverter, the operation comprising:

detecting a grid fault in which a grid voltage drops below a nominal grid voltage;

setting a total current limit to a total maximum overload current limit;

determining the active current reference and the reactive current reference according to a control function, wherein the active current reference is determined to minimize a reduction in active power production due to the grid voltage drop, wherein the active current reference and the reactive current reference are determined subject to a condition that a vector-sum of the active output current and the reactive output current is limited according to the total current limit; and controlling the power converter according to the active current reference and the reactive current reference.

13. A wind turbine, comprising:

a tower;

a nacelle disposed on the tower;

a doubly fed induction generator (DFIG) disposed in the nacelle and connected to a grid;

a power converter comprising a rotor inverter and a grid inverter that are arranged between the grid and rotor windings of the DFIG, wherein the rotor inverter is controllable to control production of active output current and reactive output current based on an active current reference and a reactive current reference respectively, and wherein the active output current and the reactive output current are based on current delivered by the DFIG and current delivered or consumed by the grid inverter; and a control system configured to perform an operation, comprising:

detecting a grid fault in which a grid voltage drops below a nominal grid voltage;

setting a total current limit to a total maximum overload current limit;

determining the active current reference and the reactive current reference according to a control function, wherein the active current reference is determined to minimize a reduction in active power production due to the grid voltage drop, wherein the active current reference and reactive current reference are determined subject to a condition that a vector-sum of the active output current and the reactive output current is limited according to the total current limit; and controlling the power converter according to the active current reference and the reactive current reference.

CERTIFICATE OF CORRECTION (continued)
U.S. Pat. No. 10,704,534 B2

14. The method according to claim 1, wherein the control function determines the active current reference based on the active power production before detecting the grid fault and an obtained grid voltage corresponding to the grid voltage drop.

15. The method according to claim 1, further comprising:
   determining a maximum period of time in which the power converter can be controlled according to the active current reference and the reactive current reference.

16. The control system according to claim 11, wherein the control function determines the active current reference based on the active power production before detecting the grid fault and an obtained grid voltage corresponding to the grid voltage drop.

17. The control system according to claim 11, wherein the total maximum overload current limit is a maximum current which can be produced by the DFIG.

18. The control system according to claim 11, wherein the total maximum overload current limit is larger than a total current limit used when the grid fault is detected.

19. The control system according to claim 11, wherein controlling the power converter according to the active current reference and the reactive current reference comprises:
   increasing the active output current from an active output current level before detecting the grid fault to the active current reference, wherein the reduction in the active power production due to the grid voltage drop is minimized.

20. The control system according to claim 11, the operation further comprising:
   determining a maximum period of time in which the power converter can be controlled according to the active current reference and the reactive current reference.--